(12) United States Patent
Feng

(10) Patent No.: US 11,992,775 B2
(45) Date of Patent: May 28, 2024

(54) METHOD AND APPARATUS FOR PROCESSING RESOURCES

(71) Applicant: BEIJING ZITIAO NETWORK TECHNOLOGY CO., LTD., Beijing (CN)

(72) Inventor: Hao Feng, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/222,301

(22) Filed: Jul. 14, 2023

(65) Prior Publication Data

US 2023/0347251 A1 Nov. 2, 2023

Related U.S. Application Data

(63) Continuation of application No. PCT/CN2021/134054, filed on Nov. 29, 2021.

(30) Foreign Application Priority Data

Jan. 22, 2021 (CN) .......................... 202110087656.1

(51) Int. Cl.
*A63F 13/822* (2014.01)
*A63F 13/45* (2014.01)

(52) U.S. Cl.
CPC ............ *A63F 13/822* (2014.09); *A63F 13/45* (2014.09)

(58) Field of Classification Search
CPC ............................... A63F 13/822; A63F 13/45
See application file for complete search history.

(56) References Cited

U.S. PATENT DOCUMENTS 9,782,677 B1    10/2017 Topkins et al.
2007/0129126 A1*  6/2007 Van Luchene ......... G06Q 30/04
                                                          463/1

(Continued)

FOREIGN PATENT DOCUMENTS

CN          106855828 A          6/2017
CN          107111809 A          8/2017

(Continued)

OTHER PUBLICATIONS

International Patent Application No. PCT/CN2021/134054; Int'l Search Report; dated Feb. 28, 2022; 2 pages.

(Continued)

*Primary Examiner* — Thomas H Henry
(74) *Attorney, Agent, or Firm* — BakerHostetler

(57) ABSTRACT

The present disclosure provides a method and apparatus for processing resources. The method comprises: in response to a trigger operation for supplementing first virtual resources, determining a current remaining resource amount of second virtual resources; then, when the remaining resource amount of the second virtual resources meets preset conditions, determining the consumption amount of the second virtual resources according to a resource amount conversion relationship between the first virtual resources and the second virtual resources, and the amount of the first virtual resources to be supplemented; and finally, according to the consumption amount of the second virtual resources and the amount of the first virtual resources to be supplemented, updating the remaining resource amounts of the first virtual resources and the second virtual resources. The embodiments of the present disclosure improve the fluency and continuity of a user operation, and simplify steps for supplementing the first virtual resources.

17 Claims, 4 Drawing Sheets

(56) References Cited

U.S. PATENT DOCUMENTS

2013/0042238 A1 2/2013 Cardona et al.
2021/0012327 A1 1/2021 Varma

FOREIGN PATENT DOCUMENTS

| CN | 110947176 A | 4/2020 |
| CN | 111249730 A | 6/2020 |
| CN | 111309481 A | 6/2020 |
| CN | 112891953 A | 6/2021 |

OTHER PUBLICATIONS httpswww.gamersky.comhandbook2018011008680_11.shtml; Jan. 30, 2018; 4 pages (Contains English Abstract).

httpswww.bilibili.comvideoBV1Yt411a7bPspm_id_from=333.788.top_right_bar_window_default_collection.content.clickvd_source=cf40494a85ec30980e4a0070d2cacd09; Jan. 19, 2019; 3 pages; (Contains English Abstract).

httpswww.bilibili.comvideoBV17t411k76Hspm_id_from=333.1007.top_right_bar_window_default_collection.content.clickvd_source=cf40494a85ec30980e4a0070d2cacd09; Dec. 23, 2018; 8 pages; (Contains English Abstract).

\* cited by examiner

METHOD AND APPARATUS FOR PROCESSING RESOURCES

CROSS REFERENCE TO RELATED APPLICATIONS

The present application is the continuation application of International Application No. PCT/CN2021/134054, titled "METHOD AND APPARATUS FOR PROCESSING RESOURCES", filed on Nov. 29, 2021, which claims the priority of the Chinese patent application No. 202110087656.1, filed on Jan. 22, 2021, and entitled "METHOD AND APPARATUS FOR PROCESSING RESOURCES", the entire contents of both of which are incorporated herein by reference.

FIELD

The present disclosure relates to the field of computer technology, and in particular, to a method and apparatus for processing resources.

BACKGROUND

In some gaming scenarios, there will typically be a variety of virtual resources, with different virtual resources having different uses, e.g., the virtual ammunition resource will be consumed when shooting operations are performed with virtual appliances such as firearms and the like. After these virtual resources are consumed, virtual characters need to get from the corresponding replenishment points again. Generally speaking, the virtual characters usually need to find the replenishment points corresponding to the virtual resources in the gaming scenarios, or use virtual props to build the replenishment points, which leads to the inability to continue shooting and other operations after the virtual resources are consumed, and has to transfer the game scenarios to find or build supply points for replenishment, resulting in the interruption of the current interaction process of virtual characters and low operation fluency.

SUMMARY

The embodiment of the disclosure provides a method and apparatus for resource processing method.

In a first aspect, a method for resource processing is provided in an embodiment of the present disclosure, the method comprises: determining a current remaining resource amount of a second virtual resource in response to a trigger operation to supplement a first virtual resource; determining a consumption amount of the second virtual resource according to a resource amount conversion relationship between the first virtual resource and the second virtual resource, and a to-be-supplemented amount of the first virtual resource in the case that the remaining resource amount of the second virtual resource meets a preset condition; and updating the remaining resource amounts of the first virtual resource and the second virtual resource according to the consumption amount of the second virtual resource, and the to-be-supplemented amount of the first virtual resource.

In an optional implementation, the determining the current remaining resource amount of the second virtual resource in response to the trigger operation to supplement the first virtual resource comprises: determining a remaining resource amount of the second virtual resource currently stored by a target device carried by a target virtual character in response to a trigger operation to supplement the first virtual resource.

In an optional implementation, the first virtual resource is a combat resource, the second virtual resource is an electric power resource, and the target device is an electric power supply device.

In an optional implementation, the first virtual resource is an ammunition resource; determining the current remaining resource amount of the second virtual resource in response to the trigger operation to supplement the first virtual resource comprises: determining a remaining electricity quantity of an electric power supply device carried by the target virtual character in response to an ammunition-changing trigger operation for a target virtual appliance manipulated by the target virtual character; determining the consumption amount of the second virtual resource according to the resource amount conversion relationship between the first virtual resource and the second virtual resource and the to-be-supplemented amount of the first virtual resource in the case that the remaining resource amount of the second virtual resource satisfies the preset condition comprises: determining an electric power consumption amount according to an ammunition amount required for the target virtual appliance to change one time, and a resource amount conversion relationship between the ammunition amount and the electricity quantity in a case where the remaining electricity quantity of the electric power supply device meets a preset condition; and updating the remaining resource amounts of the first virtual resource and the second virtual resource according to the consumption amount of the second virtual resource and the to-be-supplemented amount of the first virtual resource comprises: updating the ammunition amount of the target virtual appliance after ammunition changing and the remaining electricity quantity of the electric power supply device, according to the determined electric power consumption amount and the ammunition amount required for the target virtual appliance to change one time.

In an optional implementation, the method further comprising: displaying, at a second virtual resource management interface, raw material information collected by the target virtual character; and in response to a selection operation for at least one raw material in the raw material information, turning on a virtual electric power generation apparatus to convert the at least one raw material into electric power, and inputting the converted electric power into a virtual storage battery; the virtual storage battery being configured to power the electric power supply device.

In an optional implementation, the method further comprising: updating a remaining electricity quantity after the virtual storage battery outputs electric power, and a remaining electricity quantity of the electric power supply device after electric power supplementation, in response to an electric power supplementation operation for the electric power supply device after the target virtual character reaches a position area where the virtual storage battery is located.

In an optional implementation, when updating the remaining resource amounts of the first virtual resource and the second virtual resource, the method further comprises: displaying special-effect data supplementing the first virtual resource for a target virtual character.

In an optional implementation, the virtual storage battery is also configured to power at least one other virtual object other than the target device; the method further comprises: in response to a task execution operation for the virtual object, enabling the virtual object, displaying a task execution special effect corresponding to the task execution operation, and updating a remaining electricity quantity after the virtual storage battery powers the virtual object.

In a second aspect, an apparatus for resource processing is provided in an embodiment of the present disclosure, the apparatus for resource processing comprises: a response module configured to determine a current remaining resource amount of a second virtual resource in response to a trigger operation to supplement a first virtual resource; a determining module configured to determine a consumption amount of the second virtual resource according to a resource amount conversion relationship between the first virtual resource and the second virtual resource, and a to-be-supplemented amount of the first virtual resource in the case that the remaining resource amount of the second virtual resource meets a preset condition; and an updating module configured to update the remaining resource amounts of the first virtual resource and the second virtual resource according to the consumption amount of the second virtual resource, and the to-be-supplemented amount of the first virtual resource.

In an optional implementation, the response module is specifically configured to: determine a remaining resource amount of the second virtual resource currently stored by a target device carried by a target virtual character in response to a trigger operation to supplement the first virtual resource.

In an optional implementation, the first virtual resource is a combat resource, the second virtual resource is an electric power resource, and the target device is an electric power supply device.

In an optional implementation, the first virtual resource is an ammunition resource; the response module is specifically configured to: determine a remaining electricity quantity of an electric power supply device carried by the target virtual character in response to an ammunition-changing trigger operation for a target virtual appliance manipulated by the target virtual character;

the determining module is specifically configured to: determine an electric power consumption amount according to an ammunition amount required for the target virtual appliance to change one time, and a resource amount conversion relationship between the ammunition amount and the electricity quantity in a case where the remaining electricity quantity of the electric power supply device meets a preset condition; and the updating module is specifically configured to:

update the ammunition amount of the target virtual appliance after ammunition changing and the remaining electricity quantity of the electric power supply device, according to the determined electric power consumption amount and the ammunition amount required for the target virtual appliance to change one time.

In an optional implementation, the apparatus further comprises a conversion module, the conversion module is configured to: display, at a second virtual resource management interface, raw material information collected by the target virtual character; and in response to a selection operation for at least one raw material in the raw material information, turning on a virtual electric power generation apparatus to convert the at least one raw material into electric power, and input the converted electric power into a virtual storage battery; the virtual storage battery being configured to power the electric power supply device.

In an optional implementation, the apparatus further comprises a charging module, the charging module is configured to: update a remaining electricity quantity after the virtual storage battery outputs electric power, and a remaining electricity quantity of the electric power supply device after electric power supplementation, in response to an electric power supplementation operation for the electric power supply device after the target virtual character reaches a position area where the virtual storage battery is located.

In an optional implementation, the apparatus further comprises a playing module, the playing module is configured to: when updating the remaining resource amounts of the first virtual resource and the second virtual resource, display special-effect data supplementing the first virtual resource for a target virtual character.

In an optional implementation, the virtual storage battery is also configured to power at least one other virtual object other than the target device; the apparatus further comprises a task module, the task module is configured to: in response to a task execution operation for the virtual object, enabling the virtual object, display a task execution special effect corresponding to the task execution operation, and update a remaining electricity quantity after the virtual storage battery powers the virtual object.

In a third aspect, an electronic device is provided in an embodiment of the present disclosure, the electronic device comprises: a processor, a memory, and a bus, the memory stored with machine-readable instructions executable by the processor, the processor and the memory communicating over the bus when the computer device is running, the machine-readable instructions, when being executed by the processor, cause the processor to perform the steps of the above method for resource processing.

In a fourth aspect, a computer-readable storage medium is provided in an embodiment of the present disclosure, the computer-readable storage medium stored with a computer program therein, the computer program, when run by a processor, cause the processor to perform the steps of the above method for resource processing.

The method and apparatus for resource processing provided by embodiments of the present disclosure, determining, in response to a trigger operation for replenishing a first virtual resource, a current amount of remaining resource of a second virtual resource; then, if the amount of remaining resources of said second virtual resource satisfies a preset condition, determining a consumption amount of the second virtual resource, based on a resource amount conversion relationship between said first virtual resource and said second virtual resource, and a to-be-supplemented amount of the first virtual resource; finally, updating the remaining resource amounts of the first virtual resource and the second virtual resource according to the consumption amount of the second virtual resource, and the to-be-supplemented amount of the first virtual resource. The present disclosure achieves the replenishment of the first virtual resource by converting the second virtual resource into the first virtual resource, without interrupting the operation of the current virtual character to shift the scene to find or build the replenishment point of the first virtual resource, thereby improving the fluency and coherence of the virtual character interaction process.

In order to make the above-mentioned objects, features and advantages of the present disclosure more obvious and understandable, the following is a detailed description of the preferred embodiment, together with the drawings, as follows.

BRIEF DESCRIPTION OF THE DRAWINGS

In order to more clearly illustrate the technical solutions of the embodiments of the present disclosure, a brief description of the drawings, which are incorporated herein and form part of the specification, and which illustrate embodiments consistent with the present disclosure and are used in conjunction with the specification to illustrate the technical solutions of the present disclosure, is set forth below. It should be understood that the following figures illustrate only certain embodiments of the present disclosure and therefore should not be regarded as limiting the scope, and that other relevant figures may be obtained from these figures for those of ordinary skill in the art without creative effort.

DETAILED DESCRIPTION OF THE EMBODIMENTS

Figure 1:
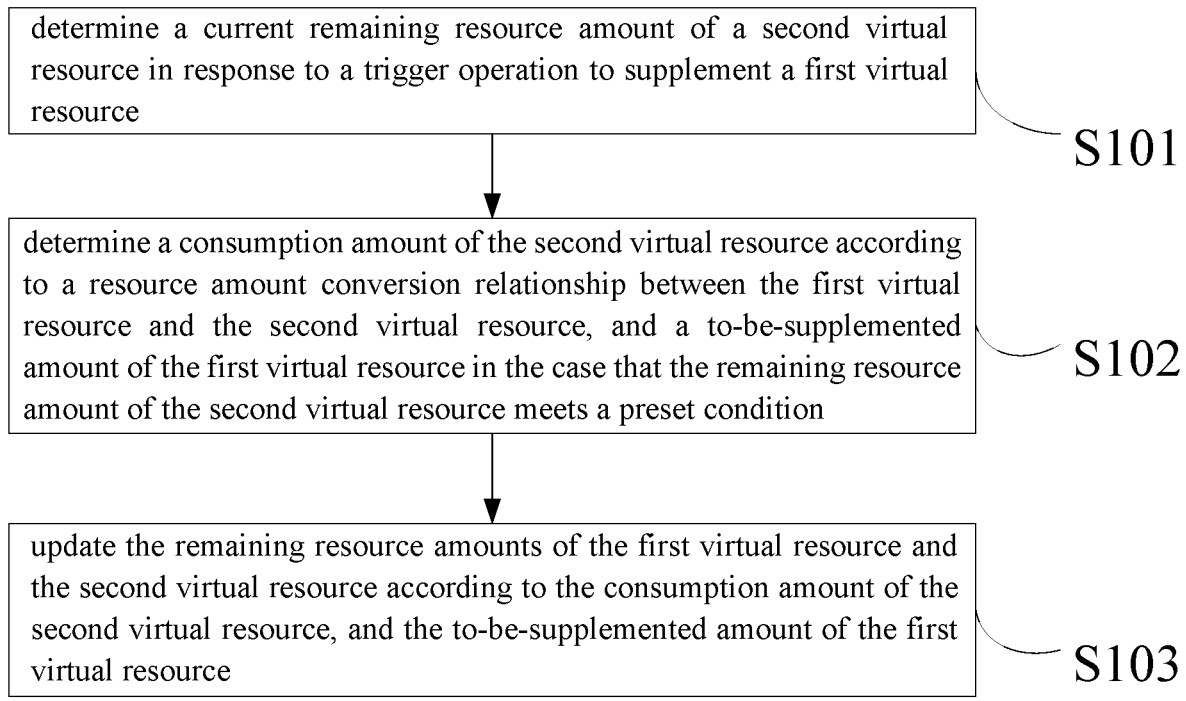
FIG. 1 shows a flowchart of a method for resource processing according to an embodiment of the present disclosure.

To make the purpose, technical solutions and advantages of embodiments of the present disclosure clearer, the technical solutions in embodiments of the present disclosure will be clearly and completely described below in connection with the drawings in embodiments of the present disclosure, and it is clear that the embodiments described are only a portion of the embodiments of the present disclosure, and not all of them. The components of the embodiments of the present disclosure generally described and illustrated in the drawings herein may be arranged and designed in a variety of different configurations. Accordingly, the following detailed description of embodiments of the present disclosure provided in the drawings is not intended to limit the scope of the present disclosure for which protection is claimed, but rather indicates only selected embodiments of the present disclosure. Based on embodiments of the present disclosure, all other embodiments obtained by those skilled in the art without creative labor fall within the scope of protection of the present disclosure.

It should be noted that similar labels and letters indicate similar items in the drawings below, so that once an item is defined in one accompanying drawing, it does not need to be further defined and explained in the subsequent drawings.

The term "and/or" herein, which simply describes an association relationship, indicates that three relationships may exist, for example, A and/or B, which may indicate the presence of A alone, the presence of both A and B, and the presence of B alone. Alternatively, the term "at least one" herein indicates any one of multiple or any combination of at least two of multiple, e.g., including at least one of A, B, C, and may indicate including any one or more elements selected from the group consisting of A, B, and C.

It is found that in some game scenarios, there are usually many kinds of virtual resources, which are used for many purposes. For example, when virtual characters use virtual appliances such as firearms to shoot, the virtual ammunition resource will be consumed. Because the virtual resources are limited, when these virtual resources are consumed, the virtual characters can no longer perform previous actions. For example, when performing a shooting operation, the virtual characters consume the carried ammunition resource, at this time, the shooting operation can no longer be performed. It is necessary to obtain virtual resources again from corresponding replenishment points, which can be found in the game scenarios or built by virtual objects carried by the virtual characters. For example, an ammunition box can be set in the game scenario by using the objects carried by the virtual characters, and through interactive operation of the ammunition box, the ammunition resource in the ammunition box can be obtained. In the process where the users acquire the virtual resources through the replenishment points, whether they are looking for the replenishment points or building the replenishment points, they need to stop the current operations first, and then spend a lot of time performing replenishment operations, which will bring a strong sense of tearing to the play process, and the fluency of operation in the game is low.

Based on the above research, the embodiment of the present disclosure provides a method for resource processing. By converting the second virtual resource into the first virtual resource, the current operations of the virtual characters are not interrupted to transfer the game scenarios to find or build the replenishment points of the first virtual resource, thereby improving the fluency and consistency of the virtual character interaction process.

Referring to FIG. 1 which is a flowchart of a method for resource processing according to an embodiment of the present disclosure, an execution subject of the method may be a terminal device or a server controlling the terminal device, the terminal device is capable of running an application program, the application program may be a game program, and game scenarios and virtual objects are provided in the game program, the method includes steps S101 to S103, wherein:

S101: a current remaining resource amount of a second virtual resource is determined in response to a trigger operation to supplement a first virtual resource.

In this step, when the trigger operation for supplementing the first virtual resource is monitored, the current remaining resource amount of the second virtual resource may be determined first. The first virtual resource may be a secondary resource in the game, such as a combat resource, such as an ammunition resource, a reply resource, and the second virtual resource may be a primary resource in the game, such as an electric power resource. Here, the primary resource may be more widely used than the secondary resource, and the primary resource may be converted to the secondary resource.

In some possible implementations, the remaining resource amount of the second virtual resource in step S101 may be the remaining resource amount of the second virtual resource currently stored by the target device carried by the target virtual character. The target virtual character may be a virtual character currently controlled by the user, the target device may be an electric power supply device in the game, such as an electric power supply bracelet, etc., the second virtual resource may be stored in the target device not more than a certain amount, and the target virtual character may carry the target device.

S102: a consumption amount of the second virtual resource is determined according to a resource amount conversion relationship between the first virtual resource and the second virtual resource, and a to-be-supplemented amount of the first virtual resource in the case that the remaining resource amount of the second virtual resource meets a preset condition.

In this step, it may be determined whether the remaining resource amount satisfies a preset condition, specifically, the preset condition may be set as that the remaining resource amount of the second virtual resource is greater than or equal to a preset resource amount, and the preset resource amount may be set according to the lowest resource storage amount corresponding to the target device, and may be further determined according to a resource amount conversion relationship between the first virtual resource and the second virtual resource.

In the step, the total amount of the second virtual resource required by the first virtual resource to be supplemented can be determined according to the resource amount conversion relationship, and whether the remaining resource amount of the second virtual resource is greater than or equal to the required total amount can be determined. If the condition is satisfied, the total amount of the required second virtual resource can be taken as the consumption amount of the second virtual resource. If the condition is not satisfied, the maximum supplementary amount can be determined according to the remaining resource amount of the second virtual resource and the resource amount conversion relationship, and the to-be-supplemented amount may be updated with the maximum supplementary amount, and the consumption amount of the second virtual resource corresponding to the maximum supplementary amount can be taken as the consumption amount of the second virtual resource.

Exemplarily, the to-be-supplemented amount of the first virtual resource can usually be the optimal amount of the supplemented resource, such as the first virtual resource is supplemented to an upper storage limit. When determining that the remaining resource amount of the second virtual resource is less than the total amount of the required second virtual resource, the remaining resource amount of the second virtual resource is not enough to be converted into a to-be-supplemented amount of the first virtual resource. The first virtual resource in part of the to-be-supplemented amount can be generated by utilizing the current remaining second virtual resource. The maximum supplementary amount for the remaining resource amount of the second virtual resource that can be converted into the first virtual resource is calculated, the to-be-supplemented amount is updated by using the maximum supplementary amount, and then the second virtual resource is consumed and the first virtual resource is supplemented according to the updated to-be-supplemented amount, wherein the maximum supplementary amount is less than the original to-be-supplemented amount.

S103: the remaining resource amounts of the first virtual resource and the second virtual resource are updated according to the consumption amount of the second virtual resource, and the to-be-supplemented amount of the first virtual resource.

In this step, the consumption amount of the second virtual resource may be subtracted from the remaining resource amount of the second virtual resource, the remaining resource amount of the second virtual resource may be updated using the obtained difference value, the remaining resource amount of the first virtual resource may be added to the to-be-supplemented value of the first virtual resource, and the obtained sum value may be used to update the remaining resource amount of the first virtual resource.

In one possible implementation, the second virtual resource is an electric power resource, the target device is an electric power supply device, and the first virtual resource is an ammunition resource in a combat resource.

Here, the ammunition resource may be one of a variety of ammunition resources, such as grenades, 5 mm caliber bullets, energy storage magazines, and the like, and the particular type may be determined according to the type of ammunition indicated in the ammunition-changing trigger operation.

In the above case, step S101 may include:
a remaining electricity quantity of an electric power supply device carried by a target virtual character is determined in response to an ammunition-changing trigger operation for a target virtual appliance manipulated by the target virtual character.

In this step, the first virtual resource is an ammunition resource, the trigger operation is an ammunition-changing trigger operation for a target virtual appliance manipulated by a target virtual character, the target virtual character may be a virtual character corresponding to the user and capable of carrying an electric power supply device in which the electric power resource may be stored, and the target virtual appliance may be a virtual weapon that consumes the ammunition resource.

The trigger operation may be a trigger operation when the remaining resource amount of the first virtual resource is insufficient for one ammunition-changing operation.

In the above case, step S102 may include:
an electric power consumption amount is determined according to an ammunition amount required for the target virtual appliance to change one time, and a resource amount conversion relationship between the ammunition amount and the electricity quantity in a case where the remaining electricity quantity of the electric power supply device meets a preset condition.

In this step, in a case where the remaining electricity quantity of the electric power supply device satisfies a preset condition, a product between the ammunition amount required for the target virtual appliance to change one time and the resource amount conversion relationship may be determined, if the product is less than or equal to the remaining electricity quantity of the electric power supply device, the product may be taken as the electric power consumption amount, and if it is greater than the remaining electricity quantity, the corresponding maximum supplementary amount and the electric power consumption amount corresponding to the maximum supplementary amount are determined.

In the above case, step S103 may include:
the ammunition amount of the target virtual appliance after ammunition changing and the remaining electricity quantity of the electric power supply device are updated according to the determined electric power consumption amount and the ammunition amount required for the target virtual appliance to change one time.

In this step, the determined electric power consumption amount may be subtracted from the remaining electricity quantity of the electric power supply device, and the resulting difference may be used as the updated remaining electricity quantity, and the ammunition amount before ammunition changing is added with the ammunition mount required for ammunition changing, and the summed value may be used as the ammunition amount after ammunition changing.

In this way, by converting the electric power resource into the ammunition resource, the target virtual character can quickly obtain the ammunition resource without consuming a lot of time to find or build replenishment points of the first virtual resource, which is convenient and fast, and has high operation smoothness.

Here, the first virtual resource may also be a skill resource, the skill resource may be a virtual resource in a game, such as a magic value, an energy value, a life value, etc., by consuming the skill resource, the virtual character may obtain a skill effect corresponding to the skill, such as obtaining a gain, causing an injury, imposing an abnormal state, etc. When the virtual character needs to supplement the skill resource, the trigger operation of supplementing the skill resource may be triggered, at this time the consumption amount of the second virtual resource to which the skill resource corresponds is determined, and then the remaining resource amounts of the skill resource and the second virtual resource are updated.

Further, the first virtual resource may include multiple types of resources, and in specific implementation, multiple types of first virtual resources may be replenished simultaneously by using the second virtual resource. For example, when the target virtual character triggers the shooting operation and the skill releasing operation simultaneously, the two resources may be replenished simultaneously based on the electric power resource.

In the embodiment of the present disclosure, the above-mentioned second virtual resource may be generated by a virtual electric power generation apparatus, specifically the generation steps are as follows:

at a second virtual resource management interface, raw material information collected by the target virtual character is displayed; and in response to a selection operation for at least one raw material in the raw material information, a virtual electric power generation apparatus is turned on to convert the at least one raw material into electric power, and the converted electric power is input into a virtual storage battery; the virtual storage battery being configured to power the electric power supply device.

In this step, the raw material information collected by the target virtual character may be displayed through the second resource management interface, the user may select at least one raw material in the raw material information through a selection operation, and after detecting the selection operation may control the virtual electric power generation apparatus to turn on, convert the at least one raw material corresponding to the selection operation into electric power, and store the converted electric power into the virtual storage battery.

The raw material may be a virtual resource, such as wood, mineral, etc., that the target virtual character acquires in the game scenario. When the virtual electric power generation apparatus converts the raw material into electric power again, a conversion period required for the conversion may be determined based on the conversion efficiency of the virtual electric power generation apparatus and the resource value of the raw material, and the raw material may be gradually converted into electric power according to the conversion efficiency during the conversion period.

The virtual electric power generation apparatus may include a plurality of types, as for example, a thermal power generation apparatus, a wind power generation apparatus, a nuclear power generation apparatus, etc., different types of power generation apparatuses may be provided with different conversion efficiencies, and in performing power conversion, a current power conversion progress may be displayed, and the power conversion progress may include information such as a remaining conversion time, a converted electricity quantity, and the like.

Here, the virtual storage battery can power the electric power supply device, it is also possible to power other virtual objects in the game scenario, the virtual objects can implement some virtual functions in the game when running, and consume electric power at certain power consumption, such as the virtual objects can be virtual buildings that need to consume electric power, some skill objects that need to gain through electric power, etc. The virtual storage battery may be provided with an upper limit of stored electric power, and the maximum amount of stored electric power may be determined according to an attribute value of the target virtual character in the game.

At the time of electric power conversion, the electric power conversion can be controlled based on information such as the current stored electricity quantity, the maximum stored electricity quantity, the electric power consumption power of the virtual storage battery, and the power conversion efficiency of the virtual electric power generation apparatus, for example, when the available space remaining in the virtual storage battery is insufficient to store the electric power resource converted according to the set conversion efficiency, the electric power conversion efficiency can be reduced below the current electric power consumption power, so that the efficiency of generating electric power when the virtual storage battery converts electric power is lower than or equal to the electric power consumption power, and the electric power overflow when the electric power is converted can be prevented.

In an embodiment of the present disclosure, the electricity quantity in the electric power supply device will gradually decrease with the use, so that the electric power can be supplemented for the electric power supply device by the following step:

a remaining electricity quantity after the virtual storage battery outputs electric power, and a remaining electricity quantity of the electric power supply device after electric power supplementation are updated, in response to an electric power supplementation operation for the electric power supply device after the target virtual character reaches a position area where the virtual storage battery is located.

In this step, the electric power supply device carried by the target virtual character can perform electric power supplementation through the virtual storage battery, the target virtual character may move to the position area where the virtual storage battery is located, and perform an electric power supplementation operation of the electric power supply device in the position area, the remaining electricity quantity after the electric power output of the virtual storage battery and the remaining electricity quantity after electric power supplementation by the electric power supply device can be updated according to a preset charging efficiency, and the updating of the remaining electricity quantity can be stopped after the stop of the electric power supplementation operation is detected. Here, the stop of the electric power supplementation operation may be stopped when the remaining electricity quantity in the virtual storage battery is 0, or stopped after the remaining electricity quantity of the electric power supply device reaches the maximum value, or may be actively stopped by the target virtual character.

In a possible embodiment, when the remaining resource amounts of the first virtual resource and the second virtual resource are updated, special effect data for supplementing the first virtual resource to the target virtual character may be displayed, for example, the special effect data of generating the ammunition resource by 3D printing using the electric power supply device can be displayed, so that the supplementary effect of the first virtual resource is more realistic.

In an embodiment of the present disclosure, when the virtual storage battery powers other virtual objects than the target device, a user can perform various tasks with the virtual object, for instance, the user can execute an operation in response to a task for the virtual object, enable the virtual object, display the task execution special effect corresponding to the task execution operation, such as generating a protective cover, establishing a virtual building, adding a gain effect, etc., and update the remaining electricity quantity of the virtual storage battery after supplying power to the virtual object. Specifically, the remaining electricity quantity before updating can be subtracted from the electricity quantity consumed by the task execution operation, and the obtained difference value can be taken as the remaining electricity quantity of the updated virtual storage battery.

Figure 2:
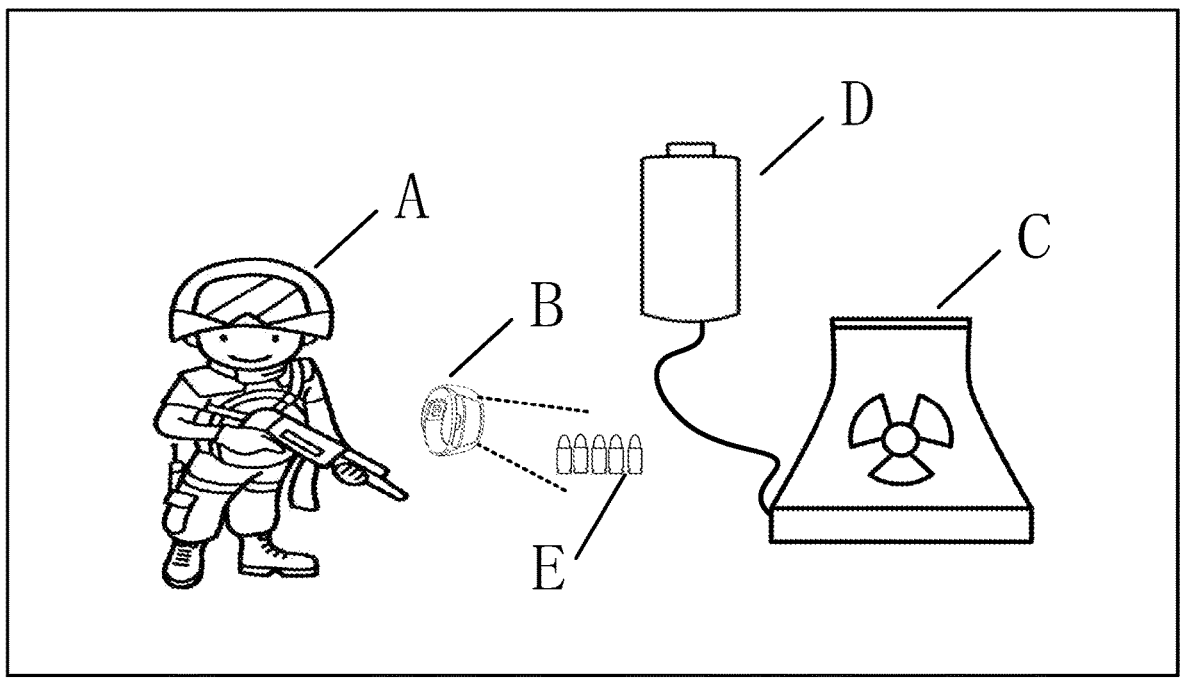
FIG. 2 shows a schematic diagram of an interactive interface according to an embodiment of the present disclosure.

For example, referring to FIG. 2 which is a schematic diagram of an interactive interface according to an embodiment of the present disclosure, the interactive interface of FIG. 2 may be a game interface, which may include a target virtual character A, an electric power supply device B, a virtual power generation device C, a virtual storage battery D, and a first virtual resource E. The target virtual character A may be a user-controlled virtual character, the user controls the target virtual character A to input an ammunition changing bounce trigger operation, converts the second virtual resource in the electric power supply device B into the first virtual resource E, the user can convert the raw material into electric energy using the virtual electric power generation apparatus C in the game scenario and store it into the virtual storage battery D, and can also transfer the electric power in the virtual storage battery D into the electric power supply device B.

The method for resource processing provided by the embodiment of the present disclosure, firstly, a current remaining resource amount of a second virtual resource is determined in response to a triggering operation to supplement a first virtual resource; then, a consumption amount of the second virtual resource is determined according to a resource amount conversion relationship between the first virtual resource and the second virtual resource, and a to-be-supplemented amount of the first virtual resource in the case that the remaining resource amount of the second virtual resource meets a preset condition; and finally, the remaining resource amounts of the first virtual resource and the second virtual resource are updated according to the consumption amount of the second virtual resource, and the to-be-supplemented amount of the first virtual resource. The embodiments of the present disclosure improve the fluency and consistency of the user's operation and simplify the operation of supplementing the first virtual resource by converting the second virtual resource into the first virtual resource, without requiring the user to interrupt the current operation, and controlling the virtual character to find or build the replenishment point of the first virtual resource.

Those skilled in the art will appreciate that in the above-described method of specific embodiments, the sequence of writing of the steps does not imply a strict sequence of execution and constitutes any limitation on the implementation process, and the specific sequence of execution of the steps should be determined by functions of the steps and possible inherent logic.

Based on the same inventive concept, the embodiment of the present disclosure also provides an apparatus for resource processing corresponding to the resource processing method. Since the problem solving principle of the apparatus in the embodiment of the present disclosure is similar to the method for resource processing in the embodiment of the present disclosure, the implementation of the apparatus can refer to the implementation of the method, and the repetitions will not be repeated here.

Figure 3:
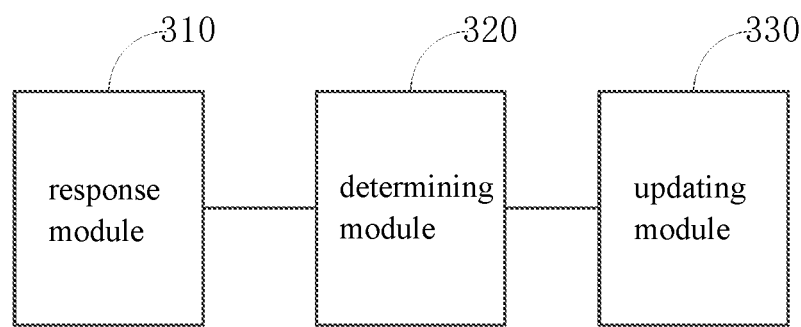
FIG. 3 shows a schematic diagram of an apparatus for resource processing according to an embodiment of the disclosure.

Referring to FIG. 3 which a schematic diagram of an apparatus for resource processing according to an embodiment of the present disclosure, the apparatus includes:

a response module 310, configured to determine a current remaining resource amount of a second virtual resource in response to a triggering operation to supplement a first virtual resource;

a determining module 320, configured to determine a consumption amount of the second virtual resource according to a resource amount conversion relationship between the first virtual resource and the second virtual resource, and a to-be-supplemented amount of the first virtual resource in the case that the remaining resource amount of the second virtual resource meets a preset condition; and an updating module 330, configured to update the remaining resource amounts of the first virtual resource and the second virtual resource according to the consumption amount of the second virtual resource, and the to-be-supplemented amount of the first virtual resource.

In an optional implementation mode, the response module 310 is specifically configured to:
determine a remaining resource amount of a second virtual resource currently stored by a target device carried by a target virtual character in response to a trigger operation to supplement the first virtual resource.

In an optional implementation mode, the first virtual resource is a combat resource, the second virtual resource is an electric power resource, and the target device is an electric power supply device.

In an optional implementation mode, the first virtual resource is an ammunition resource;
the response module 310 is specifically configured to:
determine a remaining electricity quantity of an electric power supply device carried by a target virtual character in response to an ammunition-changing trigger operation for a target virtual appliance manipulated by the target virtual character;
the determining module 320 is specifically configured to:
determine an electric power consumption amount according to an ammunition amount required for the target virtual appliance to change one time, and a resource amount conversion relationship between the ammunition amount and the electricity quantity in a case where the remaining electricity quantity of the electric power supply device meets a preset condition;
the updating module 330 is specifically configured to:
update the ammunition amount of the target virtual appliance after ammunition changing and the remaining electricity quantity of the electric power supply device, according to the determined electric power consumption amount and the ammunition amount required for the target virtual appliance to change one time.

In an optional implementation mode, the apparatus further includes a conversion module configured to:
display, at a second virtual resource management interface, raw material information collected by the target virtual character; and
in response to a selection operation for at least one raw material in the raw material information, turn on a virtual electric power generation apparatus to convert the at least one raw material into electric power, and input the converted electric power into a virtual storage battery; the virtual battery being configured to power the electric power supply device.

In an optional implementation mode, the apparatus further includes a charging module configured to:
update a remaining electricity quantity after the virtual storage battery outputs electric power, and a remaining electricity quantity of the electric power supply device after electric power supplementation, in response to an electric power supplementation operation for the electric power supply device after the target virtual character reaches a position area where the virtual storage battery is located.

In an optional implementation mode, the apparatus further includes a playing module configured to:
display special-effect data supplementing the first virtual resource for a target virtual character when updating the remaining resource amounts of the first virtual resource and the second virtual resource.

In an optional implementation mode, the virtual storage battery is also configured to power at least one other virtual object other than the target device; the apparatus further includes a task module configured to:
in response to a task execution operation for the virtual object, enable the virtual object, display a task execution special effect corresponding to the task execution operation, and update a remaining electricity quantity after the virtual storage battery powers the virtual object.

The process flow of each module in the apparatus and the interaction flow between modules can be described with reference to the relevant description in the above method embodiments and will not be described in detail here.

Figure 4:
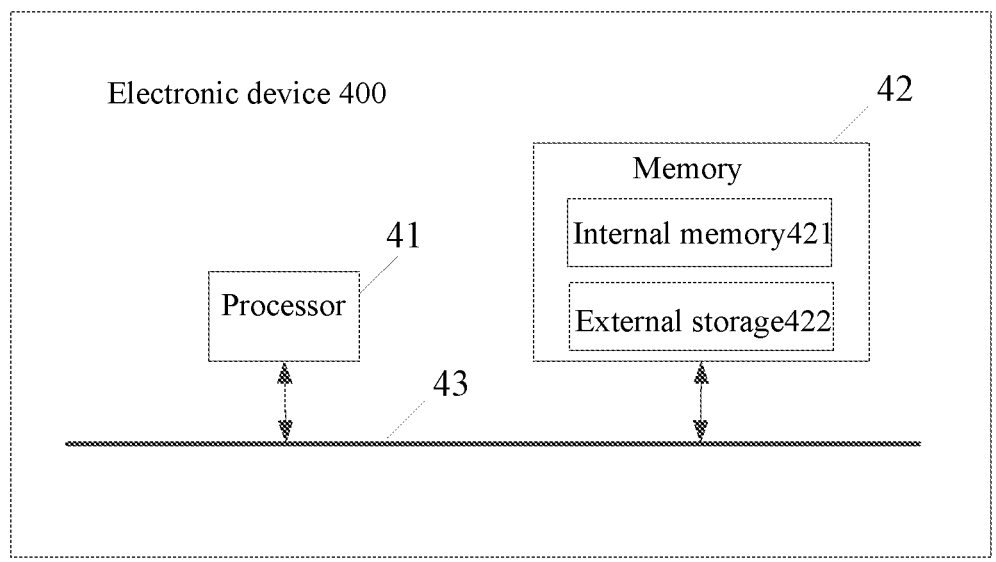
FIG. 4 shows a schematic diagram of an electronic device according to an embodiment of the present disclosure.

Corresponding to the method for resource processing in FIG. 1, the embodiment of the present disclosure further provides an electronic device 400, as shown in FIG. 4 which is a structural schematic diagram of the electronic device 400 according to the embodiment of the present disclosure, including:
a processor 41, a memory 42, and a bus 43; the memory 42 is configured to store instructions for execution, including an internal memory 421 and an external storage 422; the internal memory 421 is also referred to herein as an internal storage which is configured to temporarily store operation data in the processor 41 and data exchanged with an external storage 422 such as a hard disk, the processor 41 exchanges data with the external storage 422 through the internal memory 421, and when the electronic device 400 operates, the processor 41 communicates with the memory 42 through the bus 43 so that the processor 41 executes the following instructions:
determining a current remaining resource amount of a second virtual resource in response to a triggering operation to supplement a first virtual resource;
determining a consumption amount of the second virtual resource according to a resource amount conversion relationship between the first virtual resource and the second virtual resource, and a to-be-supplemented amount of the first virtual resource in the case that the remaining resource amount of the second virtual resource meets a preset condition; and
updating the remaining resource amounts of the first virtual resource and the second virtual resource according to the consumption amount of the second virtual resource, and the to-be-supplemented amount of the first virtual resource.

In an optional implementation mode, in the instructions executed by the processor 41, the determining the current remaining resource amount of the second virtual resource in response to the triggering operation to supplement the first virtual resource includes:
determining a remaining resource amount of a second virtual resource currently stored by a target device carried by a target virtual character in response to a trigger operation to supplement the first virtual resource.

In an optional implementation mode, in the instructions executed by the processor 41, the first virtual resource is a combat resource, the second virtual resource is an electric power resource, and the target device is an electric power supply device.

In an optional implementation mode, in the instructions executed by the processor 41, the first virtual resource is an ammunition resource;
the determining the current remaining resource amount of the second virtual resource in response to the triggering operation to supplement the first virtual resource includes:
determining a remaining electricity quantity of an electric power supply device carried by a target virtual character in response to an ammunition-changing trigger operation for a target virtual appliance manipulated by the target virtual character;
the determining the consumption amount of the second virtual resource according to the resource amount conversion relationship between the first virtual resource and the second virtual resource and the to-be-supplemented amount of the first virtual resource in the case that the remaining resource amount of the second virtual resource satisfies the preset condition includes:
determining an electric power consumption amount according to an ammunition amount required for the target virtual appliance to change one time, and a resource amount conversion relationship between the ammunition amount and the electricity quantity in a case where the remaining electricity quantity of the electric power supply device meets a preset condition; and
the updating the remaining resource amounts of the first virtual resource and the second virtual resource according to the consumption amount of the second virtual resource and the to-be-supplemented amount of the first virtual resource includes:
updating the ammunition amount of the target virtual appliance after ammunition changing and the remaining electricity quantity of the electric power supply device, according to the determined electric power consumption amount and the ammunition amount required for the target virtual appliance to change one time.

In an optional implementation mode, the processor 41 is further configured to:
display, at a second virtual resource management interface, raw material information collected by the target virtual character; and
in response to a selection operation for at least one raw material in the raw material information, turn on a virtual electric power generation apparatus to convert the at least one raw material into electric power, and input the converted electric power into a virtual storage battery;
the virtual battery being configured to power the electric power supply device.

In an optional implementation mode, the processor 41 is further configured to:

update a remaining electricity quantity after the virtual storage battery outputs electric power, and a remaining electricity quantity of the electric power supply device after electric power supplementation, in response to an electric power supplementation operation for the electric power supply device after the target virtual character reaches a position area where the virtual storage battery is located.

In an optional implementation mode, when updating the remaining resource amounts of the first virtual resource and the second virtual resource, the processor 41 is further configured to:

display special-effect data supplementing the first virtual resource for a target virtual character.

In an optional implementation mode, the virtual storage battery is further configured to power at least one other virtual object other than the target device; the processor 41 is further configured to:

in response to a task execution operation for the virtual object, enable the virtual object, display a task execution special effect corresponding to the task execution operation, and update a remaining electricity quantity after the virtual storage battery powers the virtual object.

An embodiment of the present disclosure further provides a computer-readable storage medium having stored thereon a computer program which, when run by a processor, executes the steps of the method for resource processing described in the above method embodiments. The storage medium may be a volatile or non-volatile computer readable storage medium.

The embodiments of the present disclosure further provide a computer program product carrying program code, and the program code includes instructions that can be used to execute the steps of the method for resource processing described in the method embodiment, which can be specifically referred to the above method embodiments, and will not be described in detail herein.

The computer program product described above may be implemented specifically by means of hardware, software, or a combination thereof. In one optional embodiment, the computer program product is embodied as a computer storage medium, and in another optional embodiment, the computer program product is embodied as a software product, such as a Software Development Kit (SDK), etc.

It will be clear to those skilled in the art that, for the convenience and brevity of the description, the specific working processes of the systems and apparatus described above may be referred to the corresponding processes in the preceding method embodiments and will not be repeated herein. In the several embodiments provided in this disclosure, it should be understood that the disclosed systems, devices and methods, can be implemented in other ways. The embodiments of the devices described above are merely schematic, for example, the division of the units described, which is only a logical functional division, can be divided in another way when actually implemented, and also, for example, multiple units or components can be combined or can be integrated into another system, or some features can be ignored, or not implemented. On another point, the mutual coupling or direct coupling or communication connection shown or discussed can be indirect coupling or communication connection through some communication interface, device or unit, which can be electrical, mechanical or other forms.

Said units illustrated as separate components may or may not be physically separated, and the components displayed as units may or may not be physical units, i.e., they may be located in one place or may be distributed to a plurality of network units. Some or all of these units may be selected according to practical needs to achieve the purpose of this embodiment solution.

Alternatively, each functional unit in various embodiments of the present disclosure may be integrated in a single processing unit, or each unit may be physically present separately, or two or more units may be integrated in a single unit.

Said functionality, when implemented in the form of a software functional unit and sold or used as a separate product, may be stored in a processor-executable, non-volatile computer readable storage medium. It is understood that the technical solution of the present disclosure, or that part of the technical solution that essentially contributes to the prior art, may be embodied in the form of a software product stored in a storage medium comprising a number of instructions to cause a computer device (which may be a personal computer, a server, or a network device, etc.) to perform all or some of the steps of the method described in various embodiments of the present disclosure. All or some of the steps of the method described in various embodiments of the present disclosure. The aforementioned storage media includes: USB flash drives, removable hard drives, Read-Only Memory (ROM), Random Access Memory (RAM), disks, or CD-ROMs, and other media that can store program code.

Finally, it should be noted that the above described embodiments are only specific embodiments of the present disclosure to illustrate the technical solution of the present disclosure, not to limit it, and the scope of protection of the present disclosure is not limited thereto, although the present disclosure is described in detail with reference to the foregoing embodiments, it should be understood by a person of ordinary skill in the art that any person of skill in the art, within the technical scope disclosed by the present disclosure, its Any person skilled in the art, within the scope of the technology disclosed in the present disclosure, may still modify or readily conceive of changes to the technical solutions described in the preceding embodiments, or make equivalent substitutions to some of the technical features thereof; and these modifications, changes or substitutions do not cause the essence of the corresponding technical solutions to depart from the spirit and scope of the technical solutions of the embodiments of the present disclosure, and shall be covered within the scope of protection of the present disclosure. Therefore, the scope of protection of the present disclosure shall be stated to be subject to the scope of protection of the claims.

What is claimed is:

1. A computer-implemented method for improving fluency and consistency of operations in a computer game, comprising:

detecting whether an operation to supplement a first virtual resource is triggered by a target virtual character in the computer game;

determining a resource amount of a second virtual resource stored in a target device that is carried by the target virtual character in response to detecting the operation to supplement the first virtual resource triggered by the target virtual character, wherein the target device is an electric power supply device;

determining a consumption amount of the second virtual resource based on a resource amount conversion relationship between the first virtual resource and the second virtual resource, and an optimal amount to supplement the first virtual resource in response to determining that the remaining resource amount of the second virtual resource meets a preset condition; p1 generating at least a part of the optimal amount of the first virtual resource to supplement the first virtual resource by utilizing the second virtual resource in the electric power supply device;

updating resource amounts of the first virtual resource and the second virtual resource based on the consumption amount of the second virtual resource and the at least a part of the optimal to be supplemented amount of the first virtual resource;

wherein the computer-implemented method further comprises:

displaying, at a second virtual resource management interface, raw material information collected by the target virtual character; and in response to a selection operation for at least one raw material in the raw material information, turning on a virtual electric power generation apparatus to convert the at least one raw material into electric power for powering the electric power supply device.

2. The method according to claim 1, wherein the first virtual resource is a combat resource, and the second virtual resource is an electric power resource.

3. The method according to claim 2, wherein the first virtual resource is an ammunition resource;

determining the current remaining resource amount of the second virtual resource in response to the trigger operation to supplement the first virtual resource comprises:

determining a remaining electricity quantity of an electric power supply device carried by the target virtual character in response to an ammunition-changing trigger operation for a target virtual appliance manipulated by the target virtual character;

determining the consumption amount of the second virtual resource according to the resource amount conversion relationship between the first virtual resource and the second virtual resource and the to-be-supplemented amount of the first virtual resource in the case that the remaining resource amount of the second virtual resource satisfies the preset condition comprises:

determining an electric power consumption amount according to an ammunition amount required for the target virtual appliance to change one time, and a resource amount conversion relationship between the ammunition amount and the electricity quantity in a case where the remaining electricity quantity of the electric power supply device meets a preset condition; and updating the remaining resource amounts of the first virtual resource and the second virtual resource according to the consumption amount of the second virtual resource and the to-be-supplemented amount of the first virtual resource comprises:

updating the ammunition amount of the target virtual appliance after ammunition changing and the remaining electricity quantity of the electric power supply device, according to the determined electric power consumption amount and the ammunition amount required for the target virtual appliance to change one time.

4. The method according to claim 2, further comprising:

inputting the converted electric power into a virtual storage battery; and powering the electric power supply device by the virtual storage battery.

5. The method according to claim 4, further comprising:

updating a remaining electricity quantity after the virtual storage battery outputs electric power, and a remaining electricity quantity of the electric power supply device after electric power supplementation, in response to an electric power supplementation operation for the electric power supply device after the target virtual character reaches a position area where the virtual storage battery is located.

6. The method according to claim 1, wherein when updating the remaining resource amounts of the first virtual resource and the second virtual resource, the method further comprises:

displaying special-effect data supplementing the first virtual resource for a target virtual character.

7. The method according to claim 4, wherein the virtual storage battery is also configured to power at least one other virtual object other than the target device; the method further comprises:

in response to a task execution operation for the virtual object, enabling the virtual object, displaying a task execution special effect corresponding to the task execution operation, and updating a remaining electricity quantity after the virtual storage battery powers the virtual object.

8. An electronic device, comprising: a processor and a memory wherein the memory stores machine-readable instructions executable by the processor, and wherein the machine-readable instructions, when executed by the processor, cause the processor to perform operations comprising:

detecting whether an operation to supplement a first virtual resource is triggered by a target virtual character in the computer game;

determining a resource amount of a second virtual resource stored in a target device that is carried by the target virtual character in response to detecting the operation to supplement the first virtual resource triggered by the target virtual character, wherein the target device is an electric power supply device;

determining a consumption amount of the second virtual resource based on a resource amount conversion relationship between the first virtual resource and the second virtual resource, and an optimal amount to supplement the first virtual resource in response to determining that the remaining resource amount of the second virtual resource meets a preset condition;

generating at least a part of the optimal amount of the first virtual resource to supplement the first virtual resource by utilizing the second virtual resource in the electric power supply device;

updating resource amounts of the first virtual resource and the second virtual resource according to-based on the consumption amount of the second virtual resource and the at least a part of the optimal to be supplemented amount of the first virtual resource;

wherein the operations further comprise:

displaying, at a second virtual resource management interface, raw material information collected by the target virtual character; and in response to a selection operation for at least one raw material in the raw material information, turning on a virtual electric power generation apparatus to convert the at least one raw material into electric power for powering the electric power supply device.

9. The electronic device according to claim 8, wherein the first virtual resource is a combat resource, and the second virtual resource is an electric power resource.

10. The electronic device according to claim 9, wherein the first virtual resource is an ammunition resource;
   determining the current remaining resource amount of the second virtual resource in response to the trigger operation to supplement the first virtual resource comprises:
   determining a remaining electricity quantity of an electric power supply device carried by the target virtual character in response to an ammunition-changing trigger operation for a target virtual appliance manipulated by the target virtual character;
   determining the consumption amount of the second virtual resource according to the resource amount conversion relationship between the first virtual resource and the second virtual resource and the to-be-supplemented amount of the first virtual resource in the case that the remaining resource amount of the second virtual resource satisfies the preset condition comprises:
   determining an electric power consumption amount according to an ammunition amount required for the target virtual appliance to change one time, and a resource amount conversion relationship between the ammunition amount and the electricity quantity in a case where the remaining electricity quantity of the electric power supply device meets a preset condition; and
   updating the remaining resource amounts of the first virtual resource and the second virtual resource according to the consumption amount of the second virtual resource and the to-be-supplemented amount of the first virtual resource comprises:
   updating the ammunition amount of the target virtual appliance after ammunition changing and the remaining electricity quantity of the electric power supply device, according to the determined electric power consumption amount and the ammunition amount required for the target virtual appliance to change one time.

11. The electronic device according to claim 9, the operations further comprising:
   inputting the converted electric power into a virtual storage battery; and
   powering the electric power supply device by the virtual storage battery.

12. The electronic device according to claim 11, the method operations further comprising:
   updating a remaining electricity quantity after the virtual storage battery outputs electric power, and a remaining electricity quantity of the electric power supply device after electric power supplementation, in response to an electric power supplementation operation for the electric power supply device after the target virtual character reaches a position area where the virtual storage battery is located.

13. The electronic device according to claim 8, wherein when updating the remaining resource amounts of the first virtual resource and the second virtual resource, the operations further comprise:
   displaying special-effect data supplementing the first virtual resource for a target virtual character.

14. The electronic device according to claim 11, wherein the virtual storage battery is also configured to power at least one other virtual object other than the target device; the operations further comprise:
   in response to a task execution operation for the virtual object, enabling the virtual object, displaying a task execution special effect corresponding to the task execution operation, and updating a remaining electricity quantity after the virtual storage battery powers the virtual object.

15. A non-transitory computer-readable storage medium, stored with a computer program therein, the computer program, when executed by a processor, cause the processor to perform operations comprising:
   detecting whether an operation to supplement a first virtual resource is triggered by a target virtual character in the computer game;
   determining a resource amount of a second virtual resource stored in a target device that is carried by the target virtual character in response to detecting the operation to supplement the first virtual resource triggered by the target virtual character, wherein the target device is an electric power supply device;
   determining a consumption amount of the second virtual resource based on a resource amount conversion relationship between the first virtual resource and the second virtual resource, and an optimal amount to supplement the first virtual resource in response to determining that the remaining resource amount of the second virtual resource meets a preset condition;
   generating at least a part of the optimal amount of the first virtual resource to supplement the first virtual resource by utilizing the second virtual resource in the electric power supply device;
   updating resource amounts of the first virtual resource and the second virtual resource based on the consumption amount of the second virtual resource and the at least a part of the optimal amount of the first virtual resource;
   wherein the operations further comprise:
   displaying, at a second virtual resource management interface, raw material information collected by the target virtual character; and
   in response to a selection operation for at least one raw material in the raw material information, turning on a virtual electric power generation apparatus to convert the at least one raw material into electric power for powering the electric power supply device.

16. The non-transitory computer-readable storage medium according to claim 15, wherein the first virtual resource is a combat resource, and the second virtual resource is an electric power resource.

17. The non-transitory computer-readable storage medium according to claim 16, wherein the first virtual resource is an ammunition resource;
   determining the current remaining resource amount of the second virtual resource in response to the trigger operation to supplement the first virtual resource comprises:
   determining a remaining electricity quantity of an electric power supply device carried by the target virtual character in response to an ammunition-changing trigger operation for a target virtual appliance manipulated by the target virtual character;
   determining the consumption amount of the second virtual resource according to the resource amount conversion relationship between the first virtual resource and the second virtual resource and the to-be-supplemented amount of the first virtual resource in the case that the remaining resource amount of the second virtual resource satisfies the preset condition comprises:
   determining an electric power consumption amount according to an ammunition amount required for the target virtual appliance to change one time, and a resource amount conversion relationship between the ammunition amount and the electricity quantity in a case where the remaining electricity quantity of the electric power supply device meets a preset condition; and updating the remaining resource amounts of the first virtual resource and the second virtual resource according to the consumption amount of the second virtual resource and the to-be-supplemented amount of the first virtual resource comprises:

updating the ammunition amount of the target virtual appliance after ammunition changing and the remaining electricity quantity of the electric power supply device, according to the determined electric power consumption amount and the ammunition amount required for the target virtual appliance to change one time.

\* \* \* \* \*